May 24, 1927.  E. DRAULLETTE  1,629,487

PROCESS OF MAKING PAVING BLOCKS AND SLABS MADE OF RUBBER COMPOUND

Filed Jan. 4, 1924

Inventor
E. Draullette
By Marks & Clark
Attys

Patented May 24, 1927.

1,629,487

UNITED STATES PATENT OFFICE.

EDMOND DRAULLETTE, OF PARIS, FRANCE.

PROCESS OF MAKING PAVING BLOCKS AND SLABS MADE OF RUBBER COMPOUND.

Application filed January 4, 1924, Serial No. 684,446, and in France January 8, 1923.

Numerous types of rubber paving blocks or slabs are already known as well as the methods for manufacturing and laying the same.

Paving blocks or slabs have already been formed by using, for the top side, a layer of rubber of superior quality, and for the under side, a layer constituted by a hardened mixture enclosing a wire gauze and a few cramps and by vulcanizing the whole for shaping blocks which are usually laid on a layer of cement or mortar newly spread upon a concrete bed in which the metallic cramps are driven for holding the paving blocks therein.

Small rubber plates are also formed having, on the under side, dovetail projections, these small rubber plates being usually placed on the wood paving, which is accordingly grooved for receiving the dovetail projections, or on a cement bed newly prepared.

Rubber plates are secured, by any adhesive means, on blocks made of wood, brick or other materials.

Blocks the upper layer of which is made of vulcanized rubber, have also been proposed and the remainder is composed of a mixture the main ingredient of which is sand.

This mixture comprises, alone or in combination: stones, granite, natural or baked clay, sand, cement, clinker, rock, fibrous or ligneous materials, leather, iron filings, generally speaking any animal, vegetable or mineral substance to which is added any kind of rubber, filling materials (organic or inorganic) or residues of petroleum. The whole is mixed with india rubber latex and if necessary with a suitable binding material and finally the mixture is compressed into the shape of blocks which are vulcanized alone or covered with a layer of rubber.

All these processes and products show after experiments concerning wear, that rubber is the best of the paving materials used up to this day, but that it presents complications as far as the manufacture is concerned, that the cost price is very high and that, particularly, nobody has found a practical and strong means for securing the rubber paving block on the ground covered with concrete.

The most important problem to be actually solved consists therefore in securing the rubber paving block on the foundation in such a manner that the securing means resists to the stresses and pulling strains produced by heavy vehicles running at high speed.

This invention relates to improvements in paving and flagging made of rubber compound and is adapted to avoid or attenuate the above mentioned inconveniences.

It particularly consists in a process of manufacture of paving blocks and slabs or flags made of a composition formed of manufactured rubber waste and a mineral admixture, the latter having the property of suitably securing the paving blocks or slabs to the foundation.

The process of manufacture of paving blocks and slabs or flags according to my invention consists especially in making, by moulding and by vulcanization under pressure, a tile, a brick or a flag, by using a composition made of natural or artificial rubber or similar products, preferably manufactured rubber waste, such as air tubes, covers, tyres, mats, etc., mixed in a hot condition with residues resulting from the treatment and purification of vegetable, animal or mineral fatty bodies and by incorporating in this composition, by passage between the mixing cylinders, sulphur of supervulcanization and a mineral admixture comprising sand, lime, cement, gravel, porphyry, sandstone powder, etc., alone or suitably mixed and capable of intimately binding with an intermediate layer of mortar or cement for securing the block to the foundation, and if necessary becoming united at its upper surface with a layer of composition containing a better quality of rubber.

The said block, being formed in a mould in layers containing progressively diminishing quantities of the mineral admixture is subsequently vulcanized under pressure. It can also, before or after vulcanization, be filled, in its cavities, with mortar or cement, forming an outer binding layer, and be applied, fresh or dry on the binding bed of the foundation or on bricks or agglomerates for forming together paving or flagging blocks ready for use.

The invention is described hereafter in detail with reference to the accompanying drawing illustrating, in cross sections, by way of example and diagrammatically, a few forms of execution of the paving blocks formed of a composition made of manufactured rubber waste and a mineral admixture.

Figure 1:
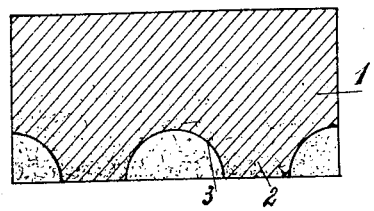
Figures 1 and 2 illustrate paving blocks formed of a composition made of manufactured rubber waste mixed with sand, lime, cement, gravel, etc.
Figure 2:
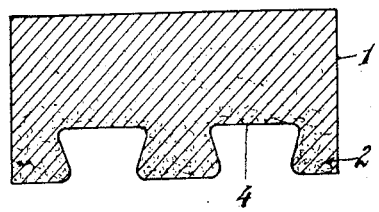

In the drawing, 1 designates a tile, plate, flag or brick constituted, by moulding and vulcanization under pressure, a plastic and resilient composition made with manufactured rubber waste and residues of various fatty bodies and in which a mineral admixture has been incorporated at 2.

This resilient composition mainly comprises: Waste from air tubes, covers, mats and the like, cut up to pieces or rasped, 20 to 40 per cent; waste from solid tyres or the like, cut up to pieces or rasped, 65 to 25 per cent; residue resulting from the treatment or purification of mineral, vegetable or animal fatty bodies which are to be easily found on the market, 15 to 35 per cent.

The mass is heated to 120 to 150° C. in a mixer for causing the waste to again become plastic through the medium of the residue of the fatty body.

In paste or pulp thus obtained, is incorporated, by passage between the mixing cylinders, sulphur of supervulcanization and a mineral admixture in the following quantities: Flowers of sulphur, 5 to 15 per cent; plastic body having the above indicated composition, 25 to 75 per cent; mineral admixture such as sand, lime, cement, gravel, porphyry, sand-stone powder, etc., alone or mixed together 70 to 10 per cent.

Several mixtures are preferably effected, containing varying quantities of mineral filling material and from these mixtures are made sheets of suitable thickness which are placed in a mould adapted to shape the paving block, care being taken to arrange at the bottom which is provided with the cavities and grooves 3 and 4, sheets containing the greatest quantity of mineral admixture, preferably formed of large grains, then sheets containing a progressively less quantity of mineral admixture and formed of finer grains and, if necessary at the top, a layer of rubber compound of a better quality.

Finally, the filled up mould is placed during 10 to 30 minutes under a press heated to a temperature of 150 to 175° C. and compressing the contents with a pressure of 30 to 75 kilograms per square centimeter.

After the treatment, the blocks are removed from the mould.

In the blocks obtained, mineral particles show bare and uncovered on their surfaces and these bare particles provide a surface which intimately and firmly binds with the mortar or cement of the intermediate layer serving as a connection between the above described compound plate or paving block 1 and the bed of concrete, or the brick or an agglomerate completing the block.

The upper part of the plate 1 can, if necessary, be formed of a layer of composition of a better quality and its surface can be smooth, striated or rough according to the applications and the result to be obtained.

The lower part of the plate 1 is provided with cavities 3, grooves 4, or with rough ridges for the purpose of increasing the surface through which is effected the binding as above described of the mineral admixture incorporated in the composition with the mortar or cement of the intermediate layer 5 whereby gripping surfaces sufficient for preventing the slipping of the paving blocks under the stresses and pulling strains of heavy vehicles running at high speed are provided.

Thus, the rubberized composition with its mineral mixture constitutes an intermediate part which perfectly binds with an upper layer made of rubber or similar material and further mineral particles showing bare on the surface of the composition make a solid union with the mortar or cement of the foundation for suitably securing the blocks in position.

These tiles, plates, flags, slabs, bricks, manufactured as above stated can be directly used for road paving, flagging of pavements, tiling of floors and in various constructions.

Figure 3:
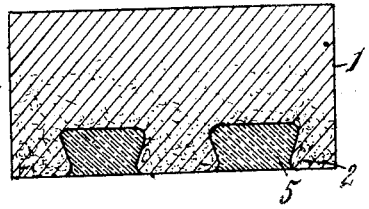
Figure 3 illustrates the same paving block the cavities of which are filled with mortar or cement.
Figure 4:
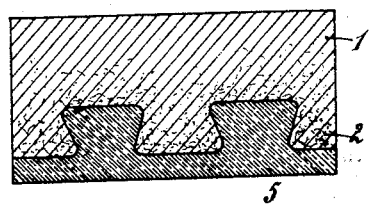
Figures 4 and 5 show the same paving block filled with mortar or cement forming a lower layer.
Figure 5:
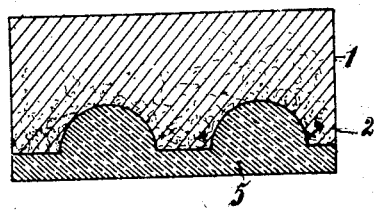

In this case, the mortar or cement is applied with a trowel on the lower surface of the plate, so as to fill up the cavities or grooves of the same, either to the level of the surface, as shown in Fig. 3, or by forming a layer entirely covering the surface, as illustrated in Figs. 4, 5, and the filled up plate is then laid on the bed of concrete newly prepared.

The mortar or cement serves as a connection between the uncovered or bare particles of the incorporated mineral admixture which comes to the surface of the plate or paving block 1, and the concrete bed of the foundation.

The cavities 3 and grooves 4 can also be filled up with mortar or cement, or the lower surface may be covered with the latter so as to form a comparatively thin layer 5, as shown in Figs. 3, 4, 5. Thus, after drying, adhesive paving blocks are obtained which it suffices to lay on a fresh layer of mortar or cement, spread over the concrete bed, for suitably securing the said blocks to the foundation.

It is to be understood that blocks composed of the layers 1 and 5 already assembled can be subjected to vulcanization.

Figure 6:
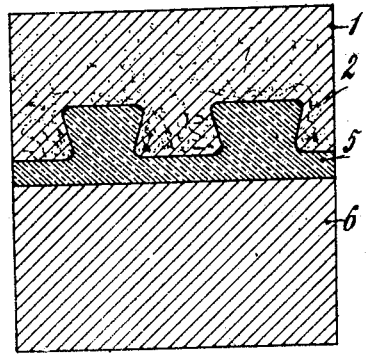
Figure 6 illustrates a plate made of manufactured rubber waste and a mineral admixture, this plate being connected by a mortar or a cement, to a brick or an agglomerate, for forming together a paving block.

Finally, it is possible to apply, through the medium of a layer 5 of mortar or cement, the same plates 1 upon bricks or agglomerates 6 so as to form single blocks, see Fig. 6, which it suffices to lay on the newly prepared concrete bed for obtaining a good paving.

What I claim as my invention and desire to secure by Letters Patent is:

1. A process for the manufacture of paving slabs, comprising forming a plastic mass of rubber and a vehicle, forming several slabs of varying composition by incorporating into said plastic mass a vulcanizing agent and different amounts of mineral filler, arranging said slabs in successive layers, the upper layer containing the smallest quantity of mineral filler, and the bottom layer containing the largest quantity of mineral filler, heating said pile of slabs under pressure to form a unitary slab of desired shape.

2. A process for the manufacture of paving slabs comprising forming a plastic mass of rubber and a vehicle, forming several slabs of varying composition by incorporating into said plastic mass a vulcanizing agent and different amounts of a mineral filler, arranging said slabs in successive layers in such manner as to obtain progressively varying amounts of mineral matter in the successive layers, the upper layer containing the smallest quantity of mineral filler and the bottom layer containing the largest quantity of mineral filler, and heating said pile of slabs under pressure to form a unitary slab of desired shape.

3. A process for the manufacture of paving slabs comprising forming a plastic mass of rubber and a vehicle, forming several slabs of varying composition by incorporating into said plastic mass a vulcanizing agent and different amounts of mineral filler, said slabs containing different size particles, arranging said slabs in successive layers in such manner as to obtain progressively varying amounts of mineral matter and progressively varying sizes of mineral particles in the successive layers, the upper layer containing the smallest quantity of mineral filler and containing the smallest particles, and the bottom layer containing the largest quantity of mineral filler and containing the largest particles, heating said pile of slabs under pressure to form a unitary slab of desired shape.

4. A process for the manufacture of paving slabs comprising forming manufactured waste rubber into fine particles, incorporating into said particles waste from the treatment of fats, heating said mixture to form a plastic mass, forming several slabs of varying composition by incorporating into said plastic mass a vulcanizing agent and different amounts of mineral filler, said slabs containing different size particles, arranging said slabs in successive layers in such manner as to obtain progressively varying amounts of mineral matter and progressively varying sizes of mineral particles in the successive layers, the upper layer containing the smallest quantity of mineral filler and containing the smallest particles, and the bottom layer containing the largest quantity of mineral filler and containing the largest particles, and heating said pile of slabs under pressure to form a unitary slab of desired shape.

In testimony whereof I have signed my name to this specification.

EDMOND DRAULLETTE.